United States Patent
Wang et al.

(10) Patent No.: US 11,763,084 B2
(45) Date of Patent: Sep. 19, 2023

(54) AUTOMATIC FORMULATION OF DATA SCIENCE PROBLEM STATEMENTS

(71) Applicant: International Business Machines Corporation, Armonk, NY (US)

(72) Inventors: Dakuo Wang, Cambridge, MA (US); Arunima Chaudhary, Boston, MA (US); Chuang Gan, Cambridge, MA (US); Mo Yu, White Plains, NY (US); Qian Pan, Canton, MA (US); Sijia Liu, Somerville, MA (US); Daniel Karl I. Weidele, Cambridge, MA (US); Abel Valente, Villa Elisa (AR)

(73) Assignee: International Business Machines Corporation, Armonk, NY (US)

( * ) Notice: Subject to any disclaimer, the term of this patent is extended or adjusted under 35 U.S.C. 154(b) by 367 days.

(21) Appl. No.: 16/989,882

(22) Filed: Aug. 10, 2020

(65) Prior Publication Data

US 2022/0043978 A1     Feb. 10, 2022

(51) Int. Cl.
*G06F 40/289* (2020.01)
*G06N 20/00* (2019.01)
*G06N 5/04* (2023.01)

(52) U.S. Cl.
CPC ............ *G06F 40/289* (2020.01); *G06N 5/04* (2013.01); *G06N 20/00* (2019.01)

(58) Field of Classification Search
CPC .................................................. G06F 40/289
See application file for complete search history.

(56) References Cited

U.S. PATENT DOCUMENTS

| 7,962,326 B2 * | 6/2011 | Tsourikov ............... G06F 40/30 707/706 |
| 9,983,859 B2 | 5/2018 | Mascaro |
| 10,296,187 B1 * | 5/2019 | Gregg ................. G06F 3/04842 |
| 10,452,677 B2 | 10/2019 | Jacob |
| 10,592,386 B2 | 3/2020 | Walters |
| 10,600,005 B2 | 3/2020 | Gunes |
| 10,607,144 B2 | 3/2020 | Doddi |
| 10,627,998 B2 | 4/2020 | Tompkins |

(Continued)

OTHER PUBLICATIONS

"AutoAI Overview," IBM Cloud Pak for Data, Jul. 2, 2020, 3 pages. <https://dataplatform.cloud.ibm.com/docs/content/wsj/analyze-data/autoai-overview.html.

(Continued)

*Primary Examiner* — Shaun Roberts
(74) *Attorney, Agent, or Firm* — Eric W. Chesley

(57) ABSTRACT

A method comprises receiving a new data set; identifying at least one prior data set of a plurality of prior data sets that matches the new data set; generating a natural language data science problem statement for the new data set based on information associated with the at least prior one data set that matches the new data set; outputting the generated natural language data science problem statement for user verification; and in response to receiving user input verifying the natural language generated data science problem statement, generating one or more AutoAI configuration settings for the new data set based on one or more AutoAI configuration settings associated with the at least one prior data set that matches the new data set.

20 Claims, 5 Drawing Sheets

(56) References Cited

U.S. PATENT DOCUMENTS

| | | | |
|---|---|---|---|
| 2008/0270119 A1* | 10/2008 | Suzuki | G06F 40/56 |
| | | | 704/9 |
| 2010/0076978 A1* | 3/2010 | Cong | G06F 40/35 |
| | | | 707/E17.069 |
| 2017/0364568 A1* | 12/2017 | Reynolds | G06F 3/0484 |
| 2018/0165604 A1 | 6/2018 | Minkin | |
| 2018/0268053 A1* | 9/2018 | Tata | G06F 16/345 |
| 2019/0066133 A1 | 2/2019 | Cotton | |
| 2019/0121847 A1* | 4/2019 | Castañeda-Villagrán | |
| | | | G06F 9/5077 |
| 2019/0130031 A1* | 5/2019 | Gourley | G06F 16/345 |
| 2019/0138946 A1* | 5/2019 | Asher | G06N 5/04 |
| 2019/0377984 A1 | 12/2019 | Ghanta | |
| 2020/0027364 A1 | 1/2020 | Singh | |
| 2020/0081916 A1 | 3/2020 | Mcshane | |
| 2020/0097847 A1 | 3/2020 | Convertino | |
| 2020/0111100 A1 | 4/2020 | Adjaoute | |
| 2021/0093919 A1* | 4/2021 | Lyke | G16H 50/20 |
| 2021/0241088 A1* | 8/2021 | Fong | G06N 20/00 |
| 2021/0326717 A1* | 10/2021 | Mueller | G06Q 50/10 |

OTHER PUBLICATIONS

"AutoAI with IBM Watson Studio," IBM Watson Studio, accessed Aug. 7, 2020, 8 pages. <https://www.ibm.com/cloud/watson-studio/autoai>.

"AutoAI," Wikipedia, accessed Aug. 7, 2020, 5 pages. <https://en.wikipedia.org/wiki/AutoAI>.

"Automated Machine Learning and Data Science [AMLDS]," IBM, accessed Aug. 7, 2020, 7 pages. <https://researcher.watson.ibm.com/researcher/view_group.php?id=8006>.

"Automated machine learning," Wikipedia, accessed Aug. 7, 2020, 2 pages. <https://en.wikipedia.org/wiki/Automated_machine_learning>.

Arnold et al., "Towards Automating the AI Operations Lifecycle," MLOps Workshop at MLSys 2020, Mar. 28, 2020, 6 pages.

Billman et al., "Automated Discovery in Managerial Problem Formulation: Formation of Causal Hypotheses for Cognitive Mapping," Decision Sciences 24(1), Jun. 2007, pp. 23-41.

Drozdal et al., "Trust In AutoML: Exploring Information Needs For Establishing Trust In Automated Machine Learning Systems," IUI '20, Mar. 17-20, 2020, p. 297-307.

He et al., "AMC: AutoML for Model Compression and Acceleration on Mobile Devices," Proceedings of the European Conference on Computer Vision (ECCV), Feb. 10, 2018, arXiv:1802.03494v4, pp. 784-800.

Mell et al., "The NIST Definition of Cloud Computing," Recommendations of the National Institute of Standards and Technology, U.S. Department of Commerce, Special Publication 800-145, Sep. 2011, 7 pgs.

Olson et al., "Identifying And Harnessing The Building Blocks Of Machine Learning Pipelines For Sensible Initialization Of A Data Science Automation Tool," arXiv:1607.08878v1 [cs.NE], Jul. 29, 2016, p. 1-13.

Shang et al., "Democratizing Data Science Through Interactive Curation Of ML Pipelines," SIGMOD '19, Jun. 30-Jul. 5, 2019, p. 1171-1188.

Wang et al., "AutoAI: Automating the End-to-End AI Lifecycle with Humans-in-the-Loop," In Proceedings of the 25th International Conference on Intelligent User Interfaces Companion, Mar. 17-20, 2020, pp. 77-78.

Wang et al., "Human-AI Collaboration in Data Science: Exploring Data Scientists' Perceptions of Automated AI," Proceedings of the ACM on Human-Computer Interaction, vol. 3, No. CSCW, Article 211, Nov. 2019, 24 pages.

Weidele et al., "AutoAIViz : Opening The Blackbox Of Automated Artificial Intelligence With Conditional Parallel Coordinates," IUI '20, Mar. 17-20, 2020, pp. 308-312.

* cited by examiner

AUTOMATIC FORMULATION OF DATA SCIENCE PROBLEM STATEMENTS

BACKGROUND

The use of Artificial Intelligence (AI) to address various needs of an organization is growing. However, there can be hurdles, such as skill-set gaps, to implementing AI in an organization's processes. Automated Artificial intelligence (AutoAI) seeks to address some of those hurdles by attempting to automate the full life cycle of a machine learning model. For example, it can apply intelligent automation to the task of building predictive machine learning models by preparing data, identifying the best type of model for the given data, choosing the features that best support the problem the model is solving, etc.

SUMMARY

Aspects of the disclosure may include a method, processor, and, system for automatic formulation of data science problem statements. In one aspect a method comprises receiving a new data set; identifying at least one prior data set of a plurality of prior data sets that matches the new data set; generating a natural language data science problem statement for the new data set based on information associated with the at least prior one data set that matches the new data set; outputting the generated natural language data science problem statement for user verification; and in response to receiving user input verifying the natural language generated data science problem statement, generating one or more AutoAI configuration settings for the new data set based on one or more AutoAI configuration settings associated with the at least one prior data set that matches the new data set.

The above summary is not intended to describe each illustrated embodiment or every implementation of the present disclosure.

DRAWINGS

Understanding that the drawings depict only exemplary embodiments and are not therefore to be considered limiting in scope, the exemplary embodiments will be described with additional specificity and detail through the use of the accompanying drawings, in which.

Figure 1:
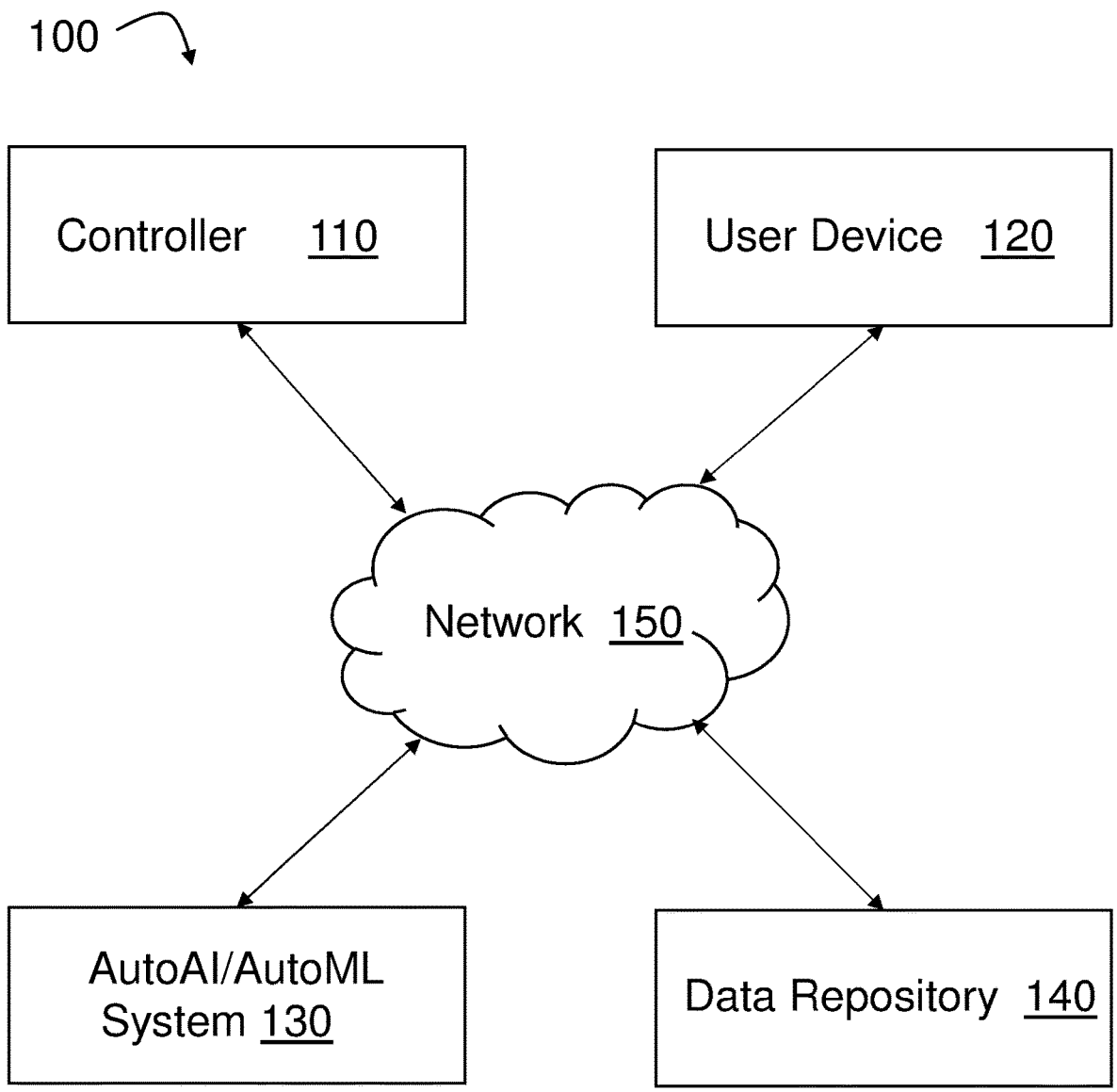
FIG. 1 is a block diagram of one embodiment of an example environment.

In accordance with common practice, the various described features are not drawn to scale but are drawn to emphasize specific features relevant to the exemplary embodiments.

DETAILED DESCRIPTION

In the following detailed description, reference is made to the accompanying drawings that form a part hereof, and in which is shown by way of illustration specific illustrative embodiments. However, it is to be understood that other embodiments may be utilized, and that logical, mechanical, and electrical changes may be made. Furthermore, the method presented in the drawing figures and the specification is not to be construed as limiting the order in which the individual steps may be performed. The following detailed description is, therefore, not to be taken in a limiting sense.

As used herein, "a number of" when used with reference items, means one or more items. For example, "a number of different types of networks" is one or more different types of networks.

Further, the phrases "at least one", "one or more," and "and/or" are open-ended expressions that are both conjunctive and disjunctive in operation. For example, each of the expressions "at least one of A, B and C", "at least one of A, B, or C", "one or more of A, B, and C", "one or more of A, B, or C" and "A, B, and/or C" means A alone, B alone, C alone, A and B together, A and C together, B and C together, or A, B and C together. In other words, "at least one of", "one or more of", and "and/or" mean any combination of items and number of items may be used from the list, but not all of the items in the list are required. The item may be a particular object, a thing, or a category. Additionally, the amount or number of each item in a combination of the listed items need not be the same. For example, in some illustrative examples, "at least one of A, B, and C" may be, for example, without limitation, two of item A; one of item B; and ten of item C; or 0 of item A; four of item B and seven of item C; or other suitable combinations.

Additionally, the term "a" or "an" entity refers to one or more of that entity. As such, the terms "a" (or "an"), "one or more" and "at least one" can be used interchangeably herein. It is also to be noted that the terms "comprising," "including," and "having" can be used interchangeably.

Furthermore, the term "automatic" and variations thereof, as used herein, refers to any process or operation done without material human input when the process or operation is performed. However, a process or operation can be automatic, even though performance of the process or operation uses material or immaterial human input, if the input is received before performance of the process or operation. Human input is deemed to be material if such input influences how the process or operation will be performed. Human input that consents to the performance of the process or operation is not deemed to be "material."

Additionally, the terms "in communication" or "communicatively coupled" include the use of any electrical or optical connection, whether wireless or wired, that allows two or more systems, components, modules, devices, etc. to exchange data, signals, or other information using any protocol or format. The terms "determine", "calculate" and "compute," and variations thereof, as used herein, are used interchangeably and include any type of methodology, process, mathematical operation or technique.

Embodiments of the disclosure described herein are configured to extend automated machine learning (AutoML) and automated artificial intelligence (AutoAI) systems to automate a process of formulating a data science problem which enables the AutoAI/AutoML systems to generate more relevant models. For example, current AutoAI/AutoML systems typically use programs and algorithms to automate at least part of the end to end human intensive and otherwise highly skilled tasks involved in building and operationalizing AI models. The automated tasks can include, for example, one or more of data cleansing, data engineering, model selection, parameter optimization, ensemble, model validation, model deployment, runtime monitoring, and model improvement.

However, current AutoAI/AutoML systems operate on an assumption that the user or data scientist has a known dataset and a well-defined data science problem. In other words, the current AutoAI/AutoML systems assume that the user has sufficient domain and data science knowledge to formulate a computable data science problem. In practice, however, human users often do not have the necessary domain knowledge and, thus, may mistakenly formulate the data science problem to be solved. For example, the user may use meaningless features or select inappropriate feature transformer or algorithms, etc. The embodiments described herein enable the automated formulation of the data science problem based on the input dataset. In particular, the embodiments described herein enable this automation through machine learning techniques which help the system learn an improve in its formulation of data science problems. Thus, the embodiments described herein can improve the performance and output of AutoAI/AutoML systems through improved automated formulation of data science problems based on the data in the dataset itself. Furthermore, although there can be differences between AutoAI and AutoML systems, as used herein, the term AutoAI is used to include both AutoAI and AutoML.

A computing device that includes a processing unit executing instructions stored on a memory may provide the improved functionality described herein. This computing device is referred to herein as a controller. This controller may be provided by a standalone computing device as predominantly described below for purposes of clarity, though in other examples the controller may be integrated into a user device, integrated into a programming platform, or the like. By configuring the controller to automatically formulate the data science problem, the performance of an AutoAI/AutoML system, such as AutoAI system 130, is improved by. For example, formulating the data science problem includes determining configuration settings for the AutoAI/AutoML system. Thus, by improving the formulation of the data science problem, the corresponding configuration settings applied to the AutoAI/AutoML systems are also improved which result in improved performance of the AutoAI/AutoML systems.

FIG. 1 depicts one embodiment of an example environment 100 in which controller 110 operates to automatically formulate a data science problem based on data in an input dataset. Controller 110 can be implemented using a computing device, such as computing system 200 of FIG. 2 that includes a processor communicatively coupled to a memory that includes instructions that, when executed by the processor, causes controller 110 to execute one or more operations described herein.

Similarly, each of user device 120, AutoAI system 130, and data repository 140 may include one or more computing devices. For example, user device 120 can include a computing device (similar to computing system of FIG. 2) with which a user can input commands for controller 110, such as a laptop, desktop, tablet, smart phone, or the like. AutoAI system 130 can include a computing device that generates models based on the data science problem and configurations formulated by the controller 100. For purposes of explanation, the discussion of the environment 100 refers to an AutoAI system. However, it is to be understood that, as used herein, an AutoAI system can also be referred to as an AutoML system or AutoAI/AutoML system.

Data repository 140 can include one or more databases that store information regarding prior input data sets as well as corresponding manual configurations selected by a user for the prior input datasets. That is, the prior data sets stored in the data repository 140 have been processed previously by the AutoAI/AutoML system 130 using configuration settings manually selected by a user and/or generated by the controller 110. As described in more detail below, the controller 110 uses the data in the data repository 140 to automatically formulate a data science problem and configuration settings for new input data. Though each of controller 110, user device 120, AutoAI system 130, and data repository 140 are depicted as discrete entities (e.g., such that each may comprise or be hosted on separate computing devices), in some examples some of these entities may be on a shared computing device. For example, controller 110 may be hosted on user device 120 and/or a computing device that stores both AutoAI system 130 and data repository 140. Additionally, one or more of the controller 110, user device 120, AutoAI system 130, and data repository 140 can each be comprised of more than one device. For example, data repository 140 can be comprised of a plurality of data servers or storage devices with data distributed across the plurality of storage devices.

These various computing devices of environment 100 can communicate over network 150. Network 150 can include a computing network over which computing messages may be sent and/or received. For example, network 150 can include the Internet, a local area network (LAN), a wide area network (WAN), a wireless network such as a wireless LAN (WLAN), or the like. Network 150 may comprise copper transmission cables, optical transmission fibers, wireless transmission, routers, firewalls, switches, gateway computers and/or edge servers. A network adapter card or network interface in each computing/processing device (e.g., controller 110, user device 120, AutoAI system 130, and/or data repository 140) may receive messages and/or instructions from and/or through network 150 and forward the messages and/or instructions for storage or execution or the like to a respective memory or processor of the respective computing/processing device. Though network 150 is depicted as a single entity in FIG. 1 for purposes of illustration, in other examples network 150 may include a plurality of private and/or public networks over which controller 110 may communicate with user device 120, AutoAI system 130 and data repository 140.

In operation, a user can input or upload a new data set via user device 120. The new data set can be sent to the controller 110 and/or the data repository 140. Additionally, commands to formulate a data science problem for the new data set can be sent from the user device 120 to the controller 110. For example, the user device 120 can display a graphical user interface which prompts a user to send a command to the controller 110 to initiate the automatic formulation of the data science problem. In response to receiving the command or signal to formulate the data science problem, the controller 110 analyzes the data in the new data set. For example, the controller 110 can retrieve the new data set from the data repository in some embodiments. In addition, the controller 110 is configured to analyze other prior data sets stored in the data repository 140.

In particular, the controller 110 is configured to identify one or more prior data sets that match the new data set. In some embodiments, to identify/determine one or more prior data sets that match the new data set, the controller 110 uses one or more machine learning models to recognize patterns and similarities between one or more of the prior data sets and the new data set. Machine learning techniques utilized by controller 110 can include, but are not limited to, decision tree learning, association rule learning, artificial neural networks, deep learning, inductive logic programming, support vector machines, clustering, Bayesian networks, reinforcement learning, representation learning, similarity/metric training, sparse dictionary learning, genetic algorithms, rule-based learning, and/or other machine learning techniques.

Specifically, machine learning techniques implemented by the controller 110 can utilize one or more of the following example techniques: K-nearest neighbor (KNN), learning vector quantization (LVQ), self-organizing map (SOM), logistic regression, ordinary least squares regression (OLSR), linear regression, stepwise regression, multivariate adaptive regression spline (MARS), ridge regression, least absolute shrinkage and selection operator (LASSO), elastic net, least-angle regression (LARS), probabilistic classifier, naïve Bayes classifier, binary classifier, linear classifier, hierarchical classifier, canonical correlation analysis (CCA), factor analysis, independent component analysis (ICA), linear discriminant analysis (LDA), multidimensional scaling (MDS), non-negative metric factorization (NMF), partial least squares regression (PLSR), principal component analysis (PCA), principal component regression (PCR), Sammon mapping, t-distributed stochastic neighbor embedding (t-SNE), bootstrap aggregating, ensemble averaging, gradient boosted decision tree (GBRT), gradient boosting machine (GBM), inductive bias algorithms, Q-learning, state-action-reward-state-action (SARSA), temporal difference (TD) learning, apriori algorithms, equivalence class transformation (ECLAT) algorithms, Gaussian process regression, gene expression programming, group method of data handling (GMDH), inductive logic programming, instance-based learning, logistic model trees, information fuzzy networks (IFN), hidden Markov models, Gaussian naïve Bayes, multinomial naïve Bayes, averaged one-dependence estimators (AODE), classification and regression tree (CART), chi-squared automatic interaction detection (CHAID), expectation-maximization algorithm, feedforward neural networks, logic learning machine, self-organizing map, single-linkage clustering, fuzzy clustering, hierarchical clustering, Boltzmann machines, convolutional neural networks, recurrent neural networks, hierarchical temporal memory (HTM), and/or other machine learning algorithms.

Additionally, various criteria can be used in various embodiments to determine if a given prior data set matches the new data set. For example, in some embodiments, the new and prior data sets are labelled data sets. That is the data sets include labels for the data values that indicate respective categories for the data values. For example, such labels can include, but are not limited to, age, domain, year, programming language, etc. One illustrative table depicting an example labelled data set is shown below in Table 1. The top row indicates example labels and the bottom row indicates example data values.

TABLE 1

| User | Domain  | Age | Python | Java |
|------|---------|-----|--------|------|
| 1    | Medical | 25  | 2      | 2    |

The labels and data values used in Table 1 are provided by way of example only to illustrate an example labelled data set. It is to be understood that the specific labels used will vary based on the implementation and data values of a given data set. In some such embodiments, the criteria for determining if a given prior data set matches the new data set is based on matching labels and/or matching data values. In some embodiments, a total number of labels that are the same in the prior data set and the new data set is used as a criterion for identifying a match between a prior data set and the new data set. For example, if the number of labels that are the same or match is greater than a predetermined threshold, then the data sets are considered a match. In other embodiments, a percentage of matching labels above a predetermined threshold is considered a match. For example, if 75% of the labels in the new data set match the labels in a prior data set, then the prior data set is considered a match, in some embodiments. It is to be understood that the specific threshold value stated above is provided by way of explanation only and that the specific thresholds used and the respective values will vary based on the specific implementation.

In yet other embodiments, the labels can be weighted, such that certain labels are weighted more than other labels. In such embodiments, a weighted score can be compared to a threshold to determine a match. In such embodiments, the weighted score can be compared to a predetermined threshold such that a prior data set which has fewer total matches than another prior data set may still be considered as a match based on the weights assigned to the matching labels. Additionally, it is to be understood that in other embodiments, other criteria in addition to or in lieu of labels can be used to determine a match between data sets. For example, in some embodiments, data values are used in addition to or in lieu of the labels. In one such example, a match in the respective values for matching labels is required to determine that the prior and new data sets match. In other such embodiments, a match in the respective values for matching labels increases a weight assigned to the matching labels. Additionally, in some embodiments, only the data values corresponding to a subset of the labels are compared while the data values corresponding to other labels are ignored in determining a match. Thus, the specific criteria can vary based on the given implementation.

In some embodiments, the controller 110 is further configured to use natural language processing (NLP) techniques to compare labels and/or data values in order to identify the one or more matching prior data sets. NLP techniques can include, but are not limited to, semantic similarity, syntactic analysis, and ontological matching. For example, in some embodiments, controller 110 may be configured to determine semantic features (e.g., word meanings, repeated words, keywords, etc.) and/or syntactic features (e.g., word structure, location of semantic features in headings, title, etc.) of data in the new and prior data sets in data repository 140. Ontological matching could be used to map semantic and/or syntactic features to a particular concept to identify matching or similar labels and/or data values, such as when identical terms are not used in the different data sets, but the terms used relate to the same concept and/or are synonyms, for example.

Furthermore, in some embodiments, the controller 110 is configured to identify/select only the prior data set having the closest or best match with new data set (e.g. based on a comparison of respective computed matching scores, percentages, etc. for each of the prior data sets). In other embodiments, the controller 110 is configured to identify/select a predetermined number of matching data sets (e.g. the 5 closest matches to the new data set). In yet other embodiments, the controller 110 is configured to identify/select all prior data sets having a computed match score or percentage above a given threshold. The threshold for being selected can be the same threshold for identifying the prior data set as a match, in some embodiments. In other embodiments, a different threshold is used, such as to act as a filter to select a subset of the number of prior data sets that meet the threshold for being considered a match.

After selecting the one or more prior data sets that match the new data set, the controller 110 is configured to generate a natural language data science problem statement for each of the identified matches. A natural language data science problem statement is a statement using vocabulary, grammar and syntax of a target natural language. For instance, an example English language data science problem statement could be "How likely is a candidate to accept an offer" or "What is the expected market value of a house in Market A". As understood by one of skill in the art, natural language refers to a language that has evolved naturally in humans as opposed to constructed languages such as computer programming languages. Thus, the controller 110 generates a data science problem statement in a target natural language that is understood by and in a language of a user.

In some embodiments, the controller 110 is configured to generate the natural language data science problem statements based on labels and data values in the prior data set. For example, by using machine learning algorithms and natural language processing on the labels and/or data values in the prior data set, the controller 110 can extrapolate a natural language data science problem statement for the prior data set. In some embodiments, the controller 110 also analyzes configuration settings applied to an AutoAI/AutoML system for processing the prior data set to generate the natural language data science problem statement. For example, if a particular data type or label was selected as the parameter to optimize, that information can be used in generating the data science problem statement. Additionally, the data science problem extrapolated based on labels, data values and/or configuration settings for the prior data set can be updated based on data values of the new data set. For example, if the extrapolated natural language problem statement for a prior data set is "What is the expected market value of a house in Market A", but the new data set relates to a different geographical area or market (e.g. Market B), then the natural language data science problem statement can be updated to "What is the expected market value of a house in Market B".

After generating one or more natural language data science problems, the controller 110 outputs the generated natural language data science problems to the user device 120. The user device 120 displays the one or more generated natural language data science problems in a graphical user interface which enables the user to select one of the one or more data science problem statements. For example, in embodiments where only one natural language data science problem statement is displayed, the user can be prompted to confirm that the data science problem is the desired data science problem to solve. Alternatively, in embodiments where more than one natural language data science problem statement is displayed, the user can be prompted to select one of the data science problem statements.

In some embodiments, the user is also presented with an option to not select any of the displayed natural language data science problem statements. For example, if only one natural language data science problem statement is displayed, the user can choose not to confirm the displayed data science problem statement. Similarly, where multiple natural language data science problem statements are displayed, the user can also be presented with an option to not select any of the displayed problem statements. In some embodiments, if the user does not select or confirm a displayed natural language data science problem statement, such feedback is provided to the controller 110 which causes controller 110 to perform another search for matching prior data sets and to generate one or more new natural language data science problem statements. For example, where only a subset of matching prior data sets were selected to generate the initial one or more natural language data science problem statements displayed for the user, other non-selected matching prior data sets can be used to generate subsequent new natural language data science problem statements in response to the user not selecting any of the initial natural language data science problem statements.

The user selection of one of the natural language data science problem statements as well as the non-selection of any of the natural language data science problem statements can be used as feedback to further train the machine learning algorithm(s) used to identify matches between the prior data sets and the new data set and/or to further train the machine learning algorithm(s) to generate the natural language data science problem statements.

After receiving user input selecting or confirming one of the generated natural language data science problem statements, the controller 110 selects configuration settings for the AutoAI/AutoML system 130. In particular, the controller 110 selects configuration settings based on configuration settings of the prior data set corresponding to the selected natural language data science problem statement. As stated before, each of the prior data sets used in comparison with the new data set has been processed by the AutoAI/AutoML system 130 using respective configuration settings. The respective configuration settings for the prior data sets are stored in the data repository 140 and associated with the corresponding prior data set. Additionally, the controller 110 can be configured to use machine learning techniques to analyze the respective configuration settings in generating configuration settings for the new data set. Based on the configuration settings associated with the prior data set corresponding to the selected natural language data science problem statement, the controller 110 selects or generates configuration settings for the new data set and transmits or applies the selected configuration settings to the AutoAI/AutoML system 130 for processing the new data set. The AutoAI/AutoML system 130 processes the new data set using the configuration settings received from the controller 110.

Figure 2:
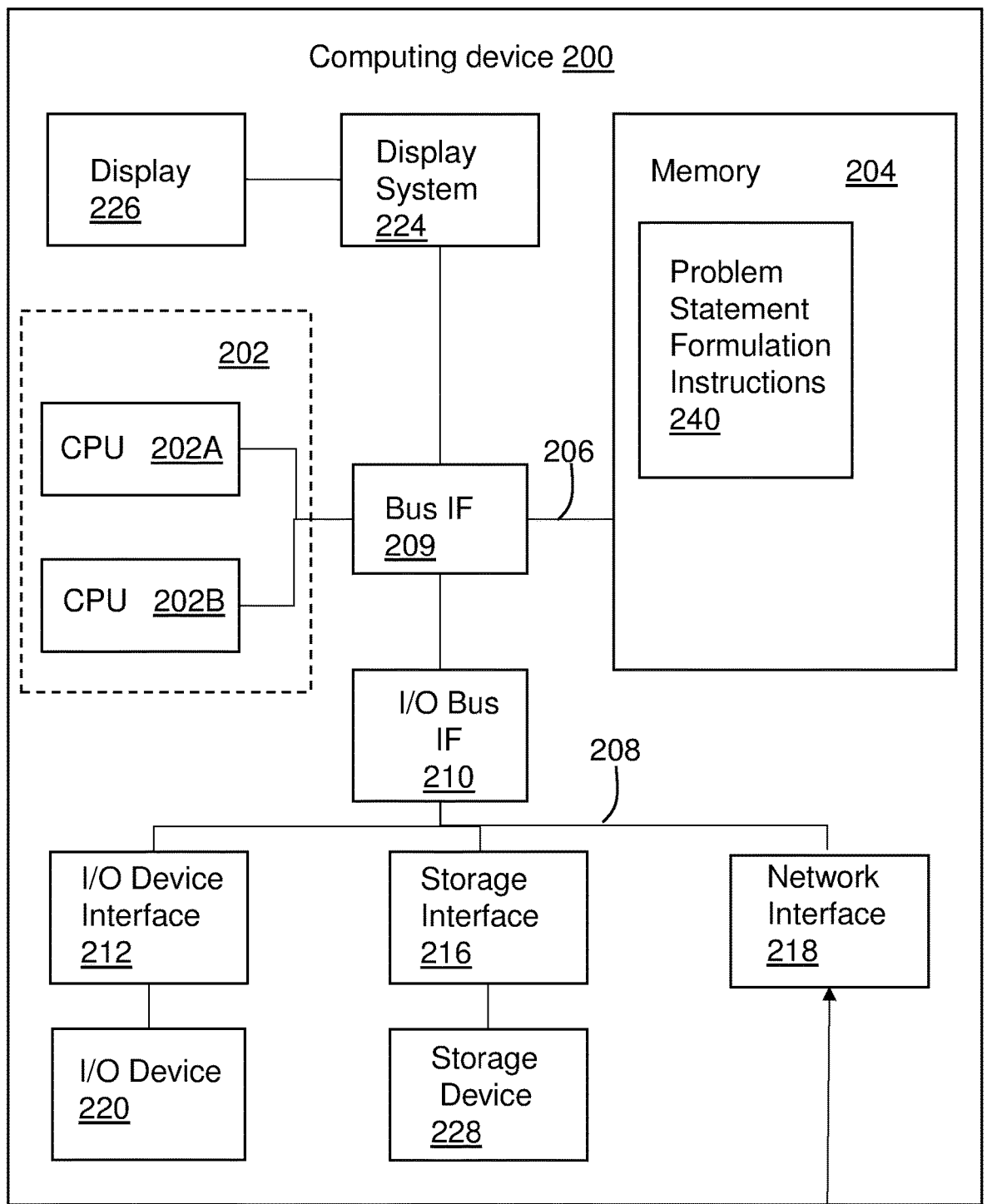
FIG. 2 is a block diagram depicting one embodiment of an example computing device.

As described above, the controller 110 may include or be part of a computing device that includes a processor configured to execute instructions stored on a memory to execute the techniques described herein. For example, FIG. 2 is a block diagram depicting one embodiment of an example computing device 200. The computing device 200 can be used to implement one or more of the elements of FIG. 1, such as the controller 110 and/or the user device 120. The components of the computing device 200 shown in FIG. 2 include one or more processors 202, a memory 204, a storage interface 216, an Input/Output ("I/O") device interface 212, and a network interface 218, all of which are communicatively coupled, directly or indirectly, for inter-component communication via a memory bus 206, an I/O bus 208, bus interface unit ("IF") 209, and an I/O bus interface unit 210.

In the embodiment shown in FIG. 2, the computing device 200 includes one or more general-purpose programmable central processing units (CPUs) 202A and 202B, herein generically referred to as the processor 202. In some embodiments, the computing device 200 contains multiple processors. However, in other embodiments, the computing device 200 is a single CPU system. Each processor 202 executes instructions stored in the memory 204. Additionally, although the embodiments are described with respect to central processing unit chips, it is to be understood that the embodiments described herein are also applicable to a computer system utilizing digital signal processors (DSP) and/or graphic processing unit (GPU) chips in addition to or in lieu of CPU chips. Furthermore, in some embodiments, the processor 202 can be implemented using neural processing unit (NPU) chips, such as the IBM TrueNorth chip. However, use of neural processing units to implement a neural network is not required. Hence, reference to a processor or processing unit herein can refer to CPU chips, GPU chips, DSP, and/or NPU chips.

In some embodiments, the memory 204 includes a random-access semiconductor memory, storage device, or storage medium (either volatile or non-volatile) for storing or encoding data and programs. For example, the memory 204 stores problem statement formulation instructions 240. When executed by a processor such as processor 202, the problem statement formulation instructions 240 cause the processor 202 to perform the functions and calculations discussed herein with respect to identifying one or more matches with prior data sets, generating one or more natural language data science problem statements, receiving user input selecting a data science problem statement, and setting configuration settings for processing the new data set with the AutoAI/AutoML system.

In some embodiments, the memory 204 represents the entire virtual memory of the computing device 200 and may also include the virtual memory of other computer devices coupled to the computing device 200 via a network. In some embodiments, the memory 204 is a single monolithic entity, but in other embodiments, the memory 204 includes a hierarchy of caches and other memory devices. For example, the memory 204 can exist in multiple levels of caches, and these caches may be further divided by function, so that one cache holds instructions while another holds non-instruction data, which is used by the processor. The memory 204 may be further distributed and associated with different processing units or sets of processing units, as is known in any various so-called non-uniform memory access (NUMA) computer architectures, for example. Hence, although the problem statement formulation instructions 240 are stored on the same memory 204 in the example shown in FIG. 2 for purposes of explanation, it is to be understood that other embodiments can be implemented differently. For example, the problem statement formulation instructions 240 can be distributed across multiple physical media.

The computing device 200 in the embodiment shown in FIG. 2 also includes a bus interface unit 209 to handle communications among the processor 202, the memory 204, the display system 224, and the I/O bus interface unit 210. The I/O bus interface unit 210 is coupled with the I/O bus 208 for transferring data to and from the various I/O units. In particular, the I/O bus interface unit 210 can communicate with multiple I/O interface units 212, 216, and 218, which are also known as I/O processors (IOPs) or I/O adapters (IOAs), through the I/O bus 208. The display system 224 includes a display controller, a display memory, or both. The display controller can provide video, still images, audio, or a combination thereof to a display device 226. The display memory may be a dedicated memory for buffering video data. The display system 224 is coupled with the display device 226. In some embodiments, the display device 226 also includes one or more speakers for rendering audio. Alternatively, one or more speakers for rendering audio may be coupled with an I/O interface unit. In alternate embodiments, one or more functions provided by the display system 224 are on board an integrated circuit that also includes the processor 202. In addition, in some embodiments, one or more of the functions provided by the bus interface unit 209 is on board an integrated circuit that also includes the processor 202.

The I/O interface units support communication with a variety of storage and I/O devices. For example, the I/O device interface unit 212 supports the attachment of one or more user I/O devices 220, which may include user output devices and user input devices (such as a keyboard, mouse, keypad, touchpad, trackball, buttons, light pen, or other pointing devices). A user can manipulate the user input devices using a user interface, in order to provide input data and commands to the user I/O device 220. Additionally, a user can receive output data via the user output devices. For example, a user interface may be presented via the user I/O device 220, such as displayed on a display device or played via a speaker.

The storage interface 216 supports the attachment of one or more storage devices 228, such as a flash memory. The contents of the memory 204, or any portion thereof, may be stored to and retrieved from the storage device 228 as needed. The network interface 218 provides one or more communication paths from the computing device 200 to other digital devices and computer devices. For example, in some embodiments the generated data science problem statements can be transmitted over the network interface 218 to a separate system (e.g. user device 120) configured to display the generated data science problem statements and receive user input. Alternatively, in some embodiments, the controller 110 and the user device 120 are implemented in the same computing device, as mentioned above. In some such embodiments, the generated data science problem statements can be communicated via a different interface, such as the I/O device interface 212 or displayed on the display 226, rather than being communicated over the network interface 218.

Although the computing device 200 shown in FIG. 2 illustrates a particular bus structure providing a direct communication path among the processors 202, the memory 204, the bus interface unit 209, the display system 224, and the I/O bus interface unit 210, in alternative embodiments the computing device 200 includes different buses or communication paths, which may be arranged in any of various forms, such as point-to-point links in hierarchical, star or web configurations, multiple hierarchical buses, parallel and redundant paths, or any other appropriate type of configuration. Furthermore, while the I/O bus interface unit 210 and the I/O bus 208 are shown as single respective units, the computing device 200, can include multiple I/O bus interface units 210 and/or multiple I/O buses 208 in other embodiments. While multiple I/O interface units are shown, which separate the I/O bus 208 from various communication paths running to the various I/O devices, in other embodiments, some or all of the I/O devices are connected directly to one or more system I/O buses.

As discussed above, in some embodiments, one or more of the components and data shown in FIG. 2 include instructions or statements that execute on the processor 202 or instructions or statements that are interpreted by instructions or statements that execute on the processor 202 to carry out the functions as described herein. In other embodiments, one or more of the components shown in FIG. 2 are implemented in hardware via semiconductor devices, chips, logical gates, circuits, circuit cards, and/or other physical hardware devices in lieu of, or in addition to, a processor-based system. In addition, in other embodiments, some of the components shown in FIG. 2 can be omitted and/or other components can be included.

Figure 3:
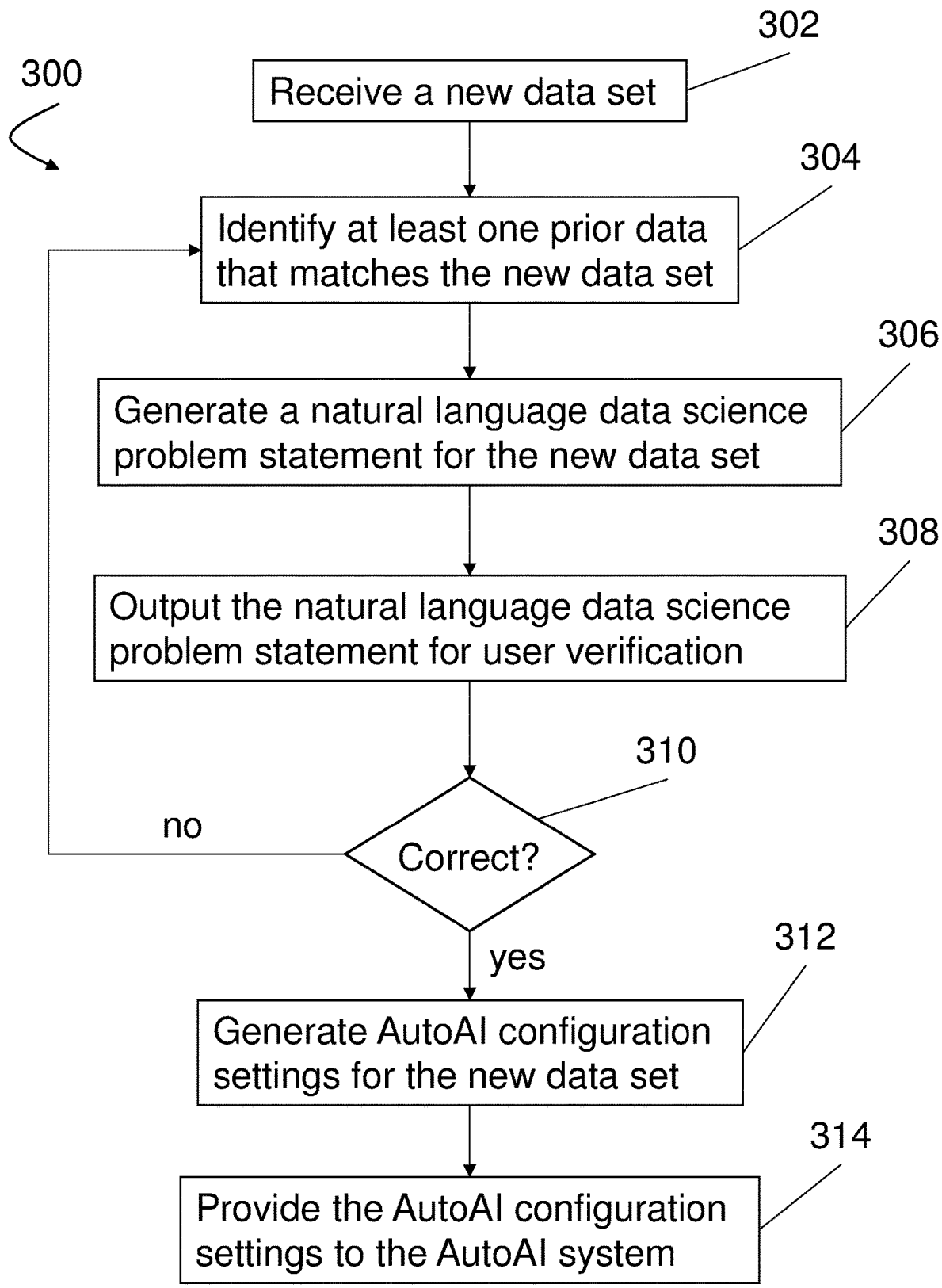
FIG. 3 is a flow chart depicting one embodiment of an example method of generating natural language data science problem statements.

FIG. 3 is a flow chart depicting one embodiment of an example method 300 of generating natural language data science problem statements. The method 300 can be implemented by a processor, such as processor 202 in computing device 200, executing instructions, such as problem statement formulation instructions 240. It is to be understood that the order of actions in example method 300 is provided for purposes of explanation and that the method can be performed in a different order in other embodiments. Similarly, it is to be understood that some actions can be omitted or additional actions can be included in other embodiments.

At 302, a new data set is received. For example, a new data set can be uploaded via a user device and communicated to the controller. The new data set can be a labelled data set as discussed above. At 304, at least one prior data set of a plurality of prior data sets that matches the new data set is identified. As discussed above, in some embodiments, only the single prior data set with the closest match to the new data set is identified. In other embodiments, a plurality of prior data sets that match the new data set are identified, as discussed above. Furthermore, example techniques and criteria for identifying or determining that a prior data set matches the new data set are discussed above.

At 306, a natural language data science problem statement for the new data set is generated based on information associated with the at least prior one data set that matches the new data set using techniques discussed above. In some embodiments, a plurality of natural language data science problem statements are generated. For example, in embodiments where a plurality of prior data sets are identified as matching the new data set, a respective natural language data science problem statement can be generated for each of the plurality of prior data sets that are identified as matching the new data set.

At 308, the generated natural language data science problem statement is output for user verification. For example, the generated natural language data science problem statement can be communicated to a user device which displays the generated natural language data science problem statement in a graphical user interface (GUI). Additionally, the GUI can include an option for the user to verify that the generated natural language data science problem statement is correct (i.e. the problem statement which the user wishes to solve or analyze). The GUI can implement various known techniques for receiving user input to verify the natural language data science problem statement, such as, but not limited to, a clickable button on the GUI, a pop-up prompt, audible verification, etc. Additionally, the GUI can include an option for the user to indicate that the generated natural language data science problem statement is not the correct data science problem that the user wishes to solve or analyze.

Furthermore, in some embodiments, a plurality of generated natural language data science problem statements are output for verification. In such embodiments, the user verification includes user selection of one of the plurality of generated natural language data science problem statements. Thus, the GUI can enable a user to select one of the displayed natural language data science problem statements. In addition, in some embodiments, the GUI includes an option to not select any of the displayed natural language data science problem statements.

At 310, the user input/feedback regarding the displayed at least one generated natural language data science problem statement is received. If the user input/feedback does not select or verify any of the generated natural language data science problem statements that were output, then the method 300 returns to block 304 in some embodiments, where one or more additional prior data sets that match the new data set are identified. Method 300 then repeats to generate and output one or more new natural language data science problem statements. Thus, as described above, the user input/feedback can be used to update machine learning algorithm(s) used in the process of identifying matching prior data sets and/or generating natural language data science problem statements.

If the user input/feedback selects or verifies one of the generated natural language data science problem statements that were output, then the method 300 continues at block 312 where one or more AutoAI configuration settings for the new data set are generated. As discussed above, the one or more AutoAI configuration settings can be based on one or more AutoAI configuration settings associated with the at least one prior data set that matches the new data set. Additionally, as discussed above, one or more machine learning algorithms can be used to generate the one or more AutoAI configuration settings. At block 314, the generated AutoAI configuration settings are provided to the AutoAI system for processing the new data set.

The present invention may be a system, a method, and/or a computer program product at any possible technical detail level of integration. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punchcards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server. In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s). In some alternative implementations, the functions noted in the blocks may occur out of the order noted in the Figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

In addition, in some embodiments, at least a portion of the functionality of the controller 110 can be implemented in a cloud computing environment. For example, in some embodiments, the controller 110 can be implemented in a cloud computer system which can include many computers, hundreds or thousands of them, disposed within one or more data centers and configured to share resources over the network. However, it is to be understood that cloud computer systems are not limited to those which include hundreds or thousands of computers and can include fewer than hundreds of computers. Some example cloud computing embodiments are discussed in more detail below. However, it is to be understood that although this disclosure includes a detailed description on cloud computing, implementation of the teachings recited herein are not limited to a cloud computing environment. Rather, embodiments of the present invention are capable of being implemented in conjunction with any other type of computing environment now known or later developed.

Cloud computing is a model of service delivery for enabling convenient, on-demand network access to a shared pool of configurable computing resources (e.g., networks, network bandwidth, servers, processing, memory, storage, applications, virtual machines, and services) that can be rapidly provisioned and released with minimal management effort or interaction with a provider of the service. This cloud model may include at least five characteristics, at least three service models, and at least four deployment models.

Characteristics are as follows:

On-demand self-service: a cloud consumer can unilaterally provision computing capabilities, such as server time and network storage, as needed automatically without requiring human interaction with the service's provider.

Broad network access: capabilities are available over a network and accessed through standard mechanisms that promote use by heterogeneous thin or thick client platforms (e.g., mobile phones, laptops, and PDAs).

Resource pooling: the provider's computing resources are pooled to serve multiple consumers using a multi-tenant model, with different physical and virtual resources dynamically assigned and reassigned according to demand. There is a sense of location independence in that the consumer generally has no control or knowledge over the exact location of the provided resources but may be able to specify location at a higher level of abstraction (e.g., country, state, or datacenter).

Rapid elasticity: capabilities can be rapidly and elastically provisioned, in some cases automatically, to quickly scale out and rapidly released to quickly scale in. To the consumer, the capabilities available for provisioning often appear to be unlimited and can be purchased in any quantity at any time.

Measured service: cloud systems automatically control and optimize resource use by leveraging a metering capability at some level of abstraction appropriate to the type of service (e.g., storage, processing, bandwidth, and active user accounts). Resource usage can be monitored, controlled, and reported, providing transparency for both the provider and consumer of the utilized service.

Service Models are as follows:

Software as a Service (SaaS): the capability provided to the consumer is to use the provider's applications running on a cloud infrastructure. The applications are accessible from various client devices through a thin client interface such as a web browser (e.g., web-based e-mail). The consumer does not manage or control the underlying cloud infrastructure including network, servers, operating systems, storage, or even individual application capabilities, with the possible exception of limited user-specific application configuration settings.

Platform as a Service (PaaS): the capability provided to the consumer is to deploy onto the cloud infrastructure consumer-created or acquired applications created using programming languages and tools supported by the provider. The consumer does not manage or control the underlying cloud infrastructure including networks, servers, operating systems, or storage, but has control over the deployed applications and possibly application hosting environment configurations.

Infrastructure as a Service (IaaS): the capability provided to the consumer is to provision processing, storage, networks, and other fundamental computing resources where the consumer is able to deploy and run arbitrary software, which can include operating systems and applications. The consumer does not manage or control the underlying cloud infrastructure but has control over operating systems, storage, deployed applications, and possibly limited control of select networking components (e.g., host firewalls).

Deployment Models are as follows:

Private cloud: the cloud infrastructure is operated solely for an organization. It may be managed by the organization or a third party and may exist on-premises or off-premises.

Community cloud: the cloud infrastructure is shared by several organizations and supports a specific community that has shared concerns (e.g., mission, security requirements, policy, and compliance considerations). It may be managed by the organizations or a third party and may exist on-premises or off-premises.

Public cloud: the cloud infrastructure is made available to the general public or a large industry group and is owned by an organization selling cloud services.

Hybrid cloud: the cloud infrastructure is a composition of two or more clouds (private, community, or public) that remain unique entities but are bound together by standardized or proprietary technology that enables data and application portability (e.g., cloud bursting for load-balancing between clouds).

A cloud computing environment is service oriented with a focus on statelessness, low coupling, modularity, and semantic interoperability. At the heart of cloud computing is an infrastructure that includes a network of interconnected nodes.

Figure 4:
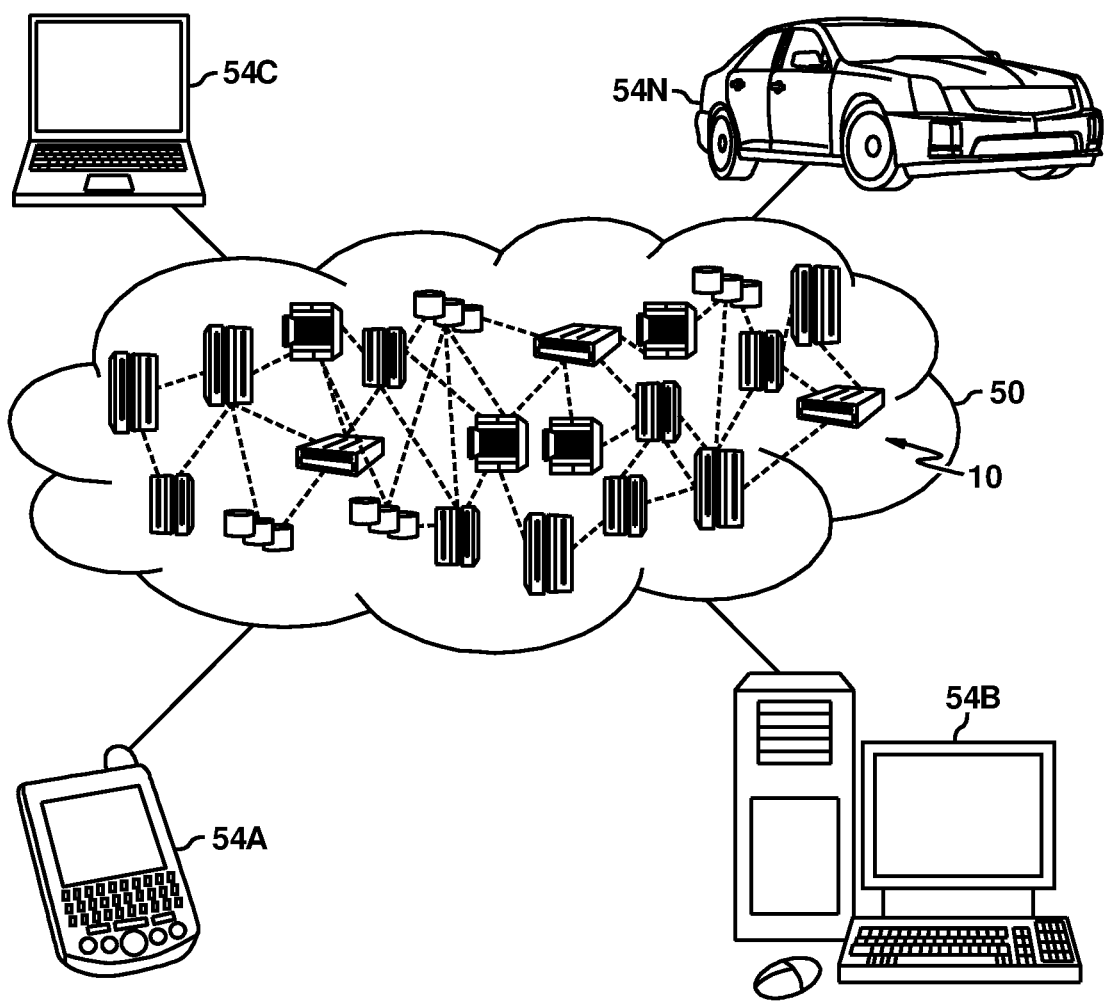
FIG. 4 depicts one embodiment of a cloud computing environment.

Referring now to FIG. 4, illustrative cloud computing environment 50 is depicted. As shown, cloud computing environment 50 includes one or more cloud computing nodes 10 with which local computing devices used by cloud consumers, such as, for example, personal digital assistant (PDA) or cellular telephone 54A, desktop computer 54B, laptop computer 54C, and/or automobile computer device 54N may communicate. Nodes 10 may communicate with one another. They may be grouped (not shown) physically or virtually, in one or more networks, such as Private, Community, Public, or Hybrid clouds as described hereinabove, or a combination thereof. This allows cloud computing environment 50 to offer infrastructure, platforms and/or software as services for which a cloud consumer does not need to maintain resources on a local computing device. It is understood that the types of computing devices 54A-N shown in FIG. 4 are intended to be illustrative only and that computing nodes 10 and cloud computing environment 50 can communicate with any type of computerized device over any type of network and/or network addressable connection (e.g., using a web browser).

Figure 5:
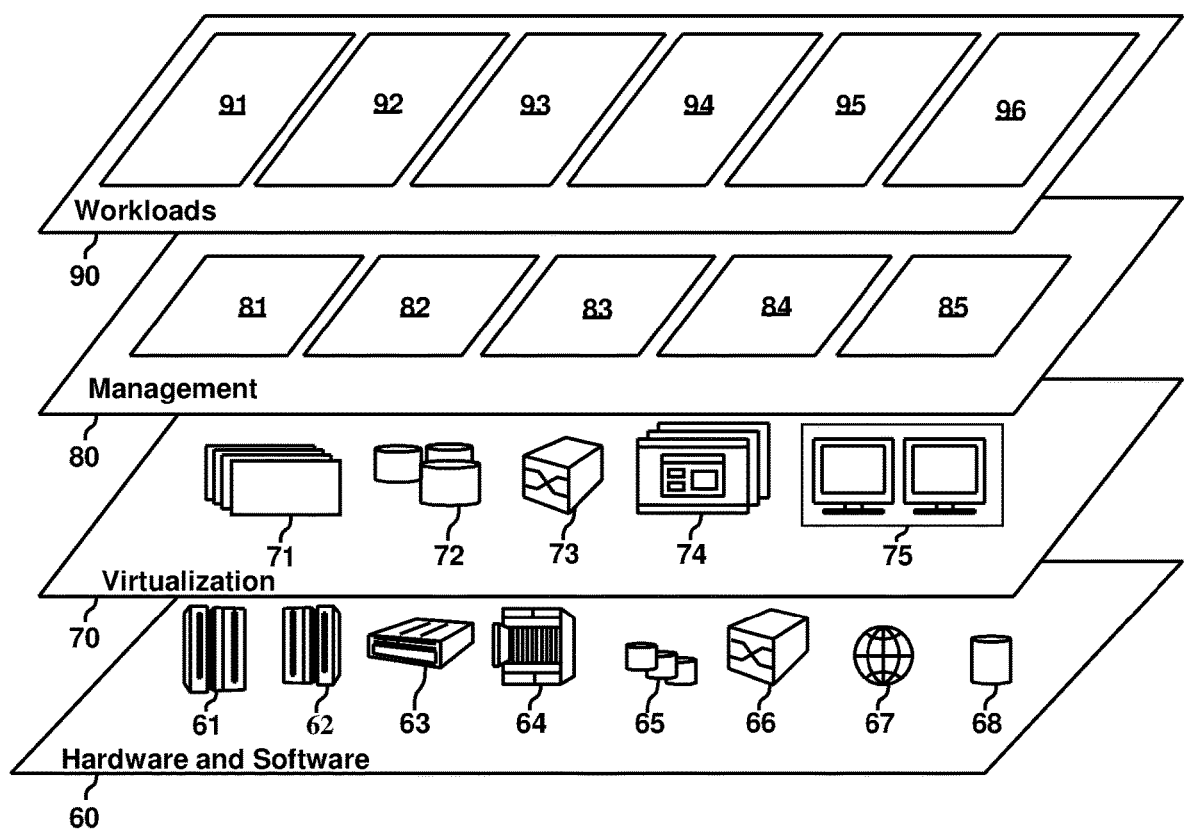
FIG. 5 depicts one embodiment of abstraction model layers.

Referring now to FIG. 5, a set of functional abstraction layers provided by cloud computing environment 50 (FIG. 4) is shown. It should be understood in advance that the components, layers, and functions shown in FIG. 5 are intended to be illustrative only and embodiments of the invention are not limited thereto. As depicted, the following layers and corresponding functions are provided:

Hardware and software layer 60 includes hardware and software components. Examples of hardware components include: mainframes 61; RISC (Reduced Instruction Set Computer) architecture-based servers 62; servers 63; blade servers 64; storage devices 65; and networks and networking components 66. In some embodiments, software components include network application server software 67 and database software 68.

Virtualization layer 70 provides an abstraction layer from which the following examples of virtual entities may be provided: virtual servers 71; virtual storage 72; virtual networks 73, including virtual private networks; virtual applications and operating systems 74; and virtual clients 75.

In one example, management layer 80 may provide the functions described below. Resource provisioning 81 provides dynamic procurement of computing resources and other resources that are utilized to perform tasks within the cloud computing environment. Metering and Pricing 82 provide cost tracking as resources are utilized within the cloud computing environment, and billing or invoicing for consumption of these resources. In one example, these resources may include application software licenses. Security provides identity verification for cloud consumers and tasks, as well as protection for data and other resources. User portal 83 provides access to the cloud computing environment for consumers and system administrators. Service level management 84 provides cloud computing resource allocation and management such that required service levels are met. Service Level Agreement (SLA) planning and fulfillment 85 provide pre-arrangement for, and procurement of, cloud computing resources for which a future requirement is anticipated in accordance with an SLA.

Workloads layer 90 provides examples of functionality for which the cloud computing environment may be utilized. Examples of workloads and functions which may be provided from this layer include: mapping and navigation 91; software development and lifecycle management 92; virtual classroom education delivery 93; data analytics processing 94; transaction processing 95; and natural language data science problem formulation 96.

Although specific embodiments have been illustrated and described herein, it will be appreciated by those of ordinary skill in the art that any arrangement, which is calculated to achieve the same purpose, may be substituted for the specific embodiments shown. Therefore, it is manifestly intended that this invention be limited only by the claims and the equivalents thereof.

What is claimed is:

1. A method comprising:
receiving a new data set;
identifying at least one prior data set of a plurality of prior data sets that matches the new data set;
generating a natural language data science problem statement for the new data set based on information associated with the at least one prior data set that matches the new data set, wherein the natural language data science problem statement poses a question that is grounded in the information associated with the at least one prior data set that matches the new data set;
outputting the natural language data science problem statement to obtain user verification that the question posed by the natural language data science problem statement is applicable to the new data set;
receiving user input that verifies the natural language data science problem statement; and
generating one or more Automated Artificial Intelligence (AutoAI) configuration settings for the new data set based on one or more AutoAI configuration settings associated with the at least one prior data set that matches the new data set.

2. The method of claim 1, wherein identifying the at least one prior data set is based on comparison of labels in the at least one prior data set and labels in the new data set.

3. The method of claim 1, wherein identifying the at least one prior data set is based on comparison of data values in the at least one prior data set and data values in the new data set.

4. The method of claim 1, wherein identifying the at least one prior data set comprises identifying a single prior data set with a closest match to the new data set.

5. The method of claim 1, wherein identifying the at least one prior data set comprises identifying a plurality of prior data sets that match the new data set;
wherein generating the natural language data science problem statement for the new data set comprises generating a plurality of natural language data science problem statements, each of the plurality of natural language data science problem statements corresponding to one of the plurality of prior data sets that match the new data set; and
wherein outputting the natural language data science problem statement for user verification comprises outputting the plurality of natural language data science problem statements for user selection of one of the plurality of natural language data science problem statements.

6. The method of claim 1, further comprising receiving user feedback regarding the natural language data science problem statement; and
updating a machine learning algorithm used in generating the natural language data science problem statement based on the user feedback.

7. The method of claim 1, wherein generating the natural language data science problem statement comprises generating the natural language data science problem statement based on labels, data values and the one or more AutoAI configuration settings for the at least one prior data set that matches the new data set.

8. A system comprising:
an interface;
a memory; and
a processor communicatively coupled to the interface and to the memory, wherein the processor is configured to:
receive a new data set via the interface;
identify at least one prior data set of a plurality of prior data sets that matches the new data set;
generate a natural language data science problem statement for the new data set based on information associated with the at least one prior data set that matches the new data set, wherein the natural language data science problem statement poses a question that is grounded in the information associated with the at least one prior data set that matches the new data set;
output the natural language data science problem statement via the interface to obtain user verification that the question posed by the natural language data science problem statement is applicable to the new data set;
receive user input verifying the natural language data science problem statement; and
generate one or more Automated Artificial Intelligence (AutoAI) configuration settings for the new data set based on one or more AutoAI configuration settings associated with the at least one prior data set that matches the new data set.

9. The system of claim 8, wherein the processor is configured to identify the at least one prior data set based on comparison of labels in the at least one prior data set and labels in the new data set.

10. The system of claim 8, wherein the processor is configured to identify the at least one prior data set based on comparison of data values in the at least one prior data set and data values in the new data set.

11. The system of claim 8, wherein the processor is configured to identify a single prior data set of with a closest match to the new data set.

12. The system of claim 8, wherein the processor is configured to identify a plurality of prior data sets that match the new data set;
wherein the processor is configured to generate a plurality of natural language data science problem statements, each of the plurality of natural language data science problem statements corresponding to one of the plurality of prior data sets that match the new data set; and
wherein the processor is configured to output the plurality of natural language data science problem statements for user selection of one of the plurality of natural language data science problem statements.

13. The system of claim 8, wherein the processor is further configured to:
receive user feedback regarding the natural language data science problem statement; and
update a machine learning algorithm used in generating the natural language data science problem statement based on the user feedback.

14. The system of claim 8, wherein the processor is configured to generate the natural language data science problem statement based on labels, data values and the one or more AutoAI configuration settings for the at least one prior data set that matches the new data set.

15. A computer program product comprising a computer readable storage medium having a computer readable program stored therein, wherein the computer readable program, when executed by a processor, causes the processor to:

receive a new data set;

identify at least one prior data set of a plurality of prior data sets that matches the new data set;

generate a natural language data science problem statement for the new data set based on information associated with the at least one prior data set that matches the new data set, wherein the natural language data science problem statement poses a question that is grounded in the information associated with the at least one prior data set that matches the new data set;

output the natural language data science problem statement to obtain user verification that the question posed by the natural language data science problem statement is applicable to the new data set;

receive user input verifying the natural language data science problem statement; and generate one or more Automated Artificial Intelligence (AutoAI) configuration settings for the new data set based on one or more AutoAI configuration settings associated with the at least one prior data set that matches the new data set.

16. The computer program product of claim 15, wherein the computer readable program is further configured to cause the processor to identify the at least one prior data set based on comparison of labels in the at least one prior data set and labels in the new data set.

17. The computer program product of claim 15, wherein the computer readable program is further configured to cause the processor to identify a single prior data set of with a closest match to the new data set.

18. The computer program product of claim 15, wherein the computer readable program is further configured to cause the processor to:

identify a plurality of prior data sets that match the new data set;

generate a plurality of natural language data science problem statements, each of the plurality of natural language data science problem statements corresponding to one of the plurality of prior data sets that match the new data set; and output the plurality of natural language data science problem statements for user selection of one of the plurality of natural language data science problem statements.

19. The computer program product of claim 15, wherein the computer readable program is further configured to cause the processor to:

receive user feedback regarding the generated natural language data science problem statement; and update a machine learning algorithm used in generating the natural language data science problem statement based on the user feedback.

20. The computer program product of claim 15, wherein the computer readable program is further configured to cause the processor to generate the natural language data science problem statement based on labels, data values and the one or more AutoAI configuration settings for the at least one prior data set that matches the new data set.

\* \* \* \* \*